US008380372B2

(12) United States Patent
Michal et al.

(10) Patent No.: US 8,380,372 B2
(45) Date of Patent: Feb. 19, 2013

(54) PROCESS FOR VERIFYING THE COHERENCE BETWEEN AIRCRAFT TAKE-OFF PARAMETERS AND AN AVAILABLE RUNWAY LENGTH

(75) Inventors: Benedicte Michal, Toulouse (FR); Fabien Pitard, Toulouse (FR); Jean-Pierre Demortier, Maurens (FR); Christine Charbonnier, Saint-Lys (FR); Isabelle Lacaze, Colomiers (FR); Gael Marchand, Toulouse (FR); Christine Le Duigou, Toulouse (FR); Jerome Cayrou, Cornebarrieu (FR); Vincent Blondin, Toulouse (FR); Frederic Lemoult, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/537,478

(22) Filed: Aug. 7, 2009

(65) Prior Publication Data

US 2010/0094488 A1 Apr. 15, 2010

(30) Foreign Application Priority Data

Aug. 26, 2008 (FR) ..................................... 08 55721

(51) Int. Cl.
*G06F 19/00* (2011.01)

(52) U.S. Cl. ........................... 701/15; 701/408; 340/945

(58) Field of Classification Search ................ 701/3, 15, 701/207, 301; 340/945
See application file for complete search history.

(56) References Cited

U.S. PATENT DOCUMENTS

| | | | | |
|---|---|---|---|---|
| 4,122,522 | A | 10/1978 | Smith | |
| 5,499,025 | A | 3/1996 | Middleton et al. | |
| 6,614,397 | B2 | 9/2003 | Pullen et al. | |
| 6,983,206 | B2 * | 1/2006 | Conner et al. | 701/301 |
| 7,079,951 | B2 * | 7/2006 | Conner et al. | 701/301 |
| 7,206,698 | B2 * | 4/2007 | Conner et al. | 701/301 |
| 7,363,145 | B2 * | 4/2008 | Conner et al. | 701/120 |
| 7,587,278 | B2 * | 9/2009 | Poe et al. | 701/301 |
| 7,702,461 | B2 * | 4/2010 | Conner et al. | 701/301 |
| 7,720,579 | B2 * | 5/2010 | Goodman et al. | 701/16 |
| 2004/0030465 | A1 * | 2/2004 | Conner et al. | 701/16 |
| 2005/0015202 | A1 * | 1/2005 | Poe et al. | 701/301 |
| 2005/0128129 | A1 * | 6/2005 | Conner et al. | 342/36 |
| 2005/0151681 | A1 * | 7/2005 | Conner et al. | 342/36 |
| 2005/0190079 | A1 * | 9/2005 | He | 340/945 |
| 2005/0192738 | A1 * | 9/2005 | Conner et al. | 701/120 |
| 2005/0192739 | A1 * | 9/2005 | Conner et al. | 701/120 |
| 2007/0124034 | A1 | 5/2007 | Pitard et al. | |

(Continued)

FOREIGN PATENT DOCUMENTS

| | | |
|---|---|---|
| FR | 2 894 045 | 6/2007 |
| FR | 2 894 046 | 6/2007 |
| WO | WO 2006/125725 A1 | 11/2006 |

*Primary Examiner* — Helal A Algahaim
(74) *Attorney, Agent, or Firm* — Oblon, Spivak, McClelland, Maier & Neustadt, L.L.P.

(57) ABSTRACT

A method for verifying coherence of takeoff parameters of an aircraft from an airport with an available runway length at a moment of takeoff comprises a step of identifying a takeoff runway and a step of validating takeoff parameters with a view to authorizing takeoff of the aircraft if the takeoff distance is shorter than the remaining runway length associated with the identified takeoff runway.

7 Claims, 5 Drawing Sheets

U.S. PATENT DOCUMENTS

2007/0288130 A1 12/2007 Lemoult et al.
2008/0109163 A1* 5/2008 Stone et al. .................. 701/211
2008/0135688 A1* 6/2008 Villaume et al. .............. 244/181
2008/0154445 A1* 6/2008 Goodman et al. ................ 701/3
2008/0195301 A1* 8/2008 Fabre et al. .................. 701/120
2008/0215198 A1* 9/2008 Richards ......................... 701/15
2009/0265090 A1* 10/2009 Poe et al. ...................... 701/120
2010/0274468 A1* 10/2010 Durham et al. ............... 701/120

* cited by examiner

PROCESS FOR VERIFYING THE COHERENCE BETWEEN AIRCRAFT TAKE-OFF PARAMETERS AND AN AVAILABLE RUNWAY LENGTH

BACKGROUND OF THE INVENTION

1. Field of the Invention

The present invention relates to a method for verifying the coherence of the takeoff parameters of an aircraft from an airport with an available runway length at the moment of takeoff.

It also relates to an aircraft capable of employing the method according to the invention.

2. Discussion of the Background

In general, the present invention relates to the field of takeoff safety of an aircraft, by verifying the coherence of the takeoff parameters of an aircraft with the available runway length at the moment of takeoff.

In practice, during preparation for takeoff of an aircraft, takeoff parameters must be inserted into the avionic systems interfacing with the pilots, in order to be initialized into the takeoff configuration and to remind the pilots of the piloting information items necessary during a phase of ground roll and a phase of initial climb during takeoff of the aircraft.

A calculation making it possible to optimize the performances of the aircraft during takeoff is performed.

This calculation depends in particular on the state of the aircraft (weight, configuration, etc.), on external conditions (temperature, wind, etc.), on the takeoff runway (length, condition, slope, etc.) and on the policy of the company chartering the aircraft (aircraft configuration, engine thrust, etc.)

This calculation may be performed manually by the pilots, or electronically by the pilots using tools available on board the aircraft, or else electronically by operators situated on the ground, communication means then making it possible for the results of the calculation to be provided to the pilots.

The parameters resulting from this calculation must then be inserted by the pilots into the avionic systems, either manually via an FMS interface (acronym for the English term "Flight Management System") of the MCDU type (acronym for the English term "Multi Purpose Control and Display Unit") or MFD type (acronym for the English term "Multi Function Display"), or by downloading parameters sent by operators situated on the ground.

By means of these information items which may be displayed, and of directions from air traffic and airport controllers, the pilots taxi the aircraft to the takeoff runway with the intention of taking off therefrom.

This takeoff procedure has risk factors at several levels, especially during operations of calculation of the airplane performances for takeoff, during insertion of the parameters into the avionic systems or else during reception of directions from the air traffic and airport controllers.

In general, the entirety of the takeoff phase, from preparation to accomplishment thereof, is a complex phase of aircraft operation, in which a large number of participants are involved.

Operational procedures as well as automatic verifications exist to identify errors in the takeoff parameters of an aircraft.

In particular, French Patent 2894046 describes a method for detecting an error of input of a takeoff parameter into a flight management system.

In that document, a takeoff distance is calculated on the basis of takeoff parameters entered into the flight management system, then is compared with an available takeoff distance stored in memory in the flight management system and corresponding to a planned takeoff runway.

Nevertheless, this planned takeoff runway corresponds to a takeoff runway introduced into the system during flight preparation for the aircraft, and it may not correspond to the actual takeoff runway, especially in the case of airport navigation errors.

From U.S. Pat. No. 6,614,397 there is also known a method for alerting pilots automatically when takeoff of an aircraft is being attempted from an erroneous takeoff runway, when a detected aircraft position does not correspond to a predetermined position, stored in memory, on the planned takeoff runway.

This alert message prompts the pilots then to interrupt the takeoff phase of the aircraft.

Under the conditions of the prior art, alert messages thus may be sent to the pilots, interrupting the takeoff regardless of what actually are the real possibilities for takeoff of the aircraft as a function of its position in the airport.

SUMMARY OF THE INVENTION

The objective of the present invention is to overcome the aforesaid disadvantages and to propose a method for verifying the coherence of the takeoff parameters so that the airplane can take off under optimal safety conditions.

For this purpose, the present invention relates to a method for verifying the coherence of the takeoff parameters of an aircraft from an airport with an available runway length at the moment of takeoff.

It comprises a step of identifying a takeoff runway, comprising the following steps:

- acquiring the position of the aircraft on the ground;
- extracting position data of a set of takeoff runways of the airport from an airport database;
- comparing the position of the aircraft and the position of the takeoff runways of the airport with a view to identifying a takeoff runway;

and it comprises a step of validating the takeoff parameters, comprising the following steps:

- calculating a takeoff distance from one or more takeoff parameters;
- extracting an available runway length associated with the takeoff runway identified in the airport database;
- determining a remaining runway length from the available runway length extracted from the position of the aircraft; and
- comparing the calculated takeoff distance and the remaining runway length with a view to authorizing takeoff of the aircraft if the takeoff distance is shorter than the remaining runway length.

In this way the verification method according to the invention makes it possible to take into account errors that may occur between flight preparation for the aircraft and takeoff, by taking into account in particular errors of ground guidance that may lead to a takeoff runway different from the initially planned takeoff runway (errors in radio communication with the air traffic and airport controllers, errors of airport signaling, errors of orientation of the pilot).

In addition, by virtue of a step of validation of the takeoff parameters, employed at the moment of takeoff, it is possible to verify the adaptation of the takeoff distance to the available runway length, by taking into account the parameters of the aircraft at the moment of takeoff.

By virtue of the invention, it is possible in this way to achieve takeoff of an aircraft in complete safety even in case of disagreement between the identified takeoff runway and a takeoff runway planned at the time of flight preparation.

Preferably, in the step of identifying a takeoff runway, a step of alerting the pilot is employed to signal disagreement between the identified takeoff runway and a takeoff runway planned during preparation for takeoff.

In this way the pilots are warned of the change that has occurred in the takeoff runway being used.

According to an advantageous characteristic of the invention, in the step of identifying a takeoff runway, in case of failure of the comparison step, a step of alerting the pilot is employed to signal that no takeoff runway of the airport has been identified as being in agreement with the position of the aircraft.

In case of failure of the comparison step, the step of identification of a takeoff runway makes it possible in this way to indicate to the pilots that the aircraft is not on any available takeoff runway of the airport, and, for example, is on a traffic path ("taxiway" in English).

The takeoff process is then interrupted.

Preferably the verification method comprises the following steps first of all:

- acquiring the position of the aircraft on the ground;
- extracting position data of a takeoff runway planned during preparation for takeoff on the basis of an airport database;
- comparing the position of the aircraft and a position of the planned takeoff runway; and the identification step is employed in case of disagreement between the position of the aircraft and the position of the planned takeoff runway.

This embodiment makes it possible to accelerate the method of verifying the coherence of the takeoff parameters of the aircraft, by employing a step of identifying a takeoff runway solely in the case in which the aircraft position does not correspond to the position of the planned takeoff runway at the time of flight preparation.

According to one embodiment, the step of validating the takeoff parameters is employed periodically up to a predetermined maximum speed of the aircraft.

In this way, the coherence of the takeoff parameters of an aircraft can be verified continuously as long as the aircraft has not attained a predetermined maximum speed. The takeoff of the aircraft may be stopped as soon as a lack of coherence has been detected.

According to a second aspect, the present invention also relates to an aircraft comprising means for verifying the coherence of takeoff parameters, capable of employing the verification method described in the foregoing.

This aircraft exhibits characteristics and advantages analogous to those described in the foregoing in relation to the verification method employed.

Other features and advantages of the invention will also become apparent in the description hereinafter.

BRIEF DESCRIPTION OF THE DRAWINGS

In the attached drawings, provided by way of non-limitative examples.

DESCRIPTION OF THE PREFERRED EMBODIMENTS

Figure 1:
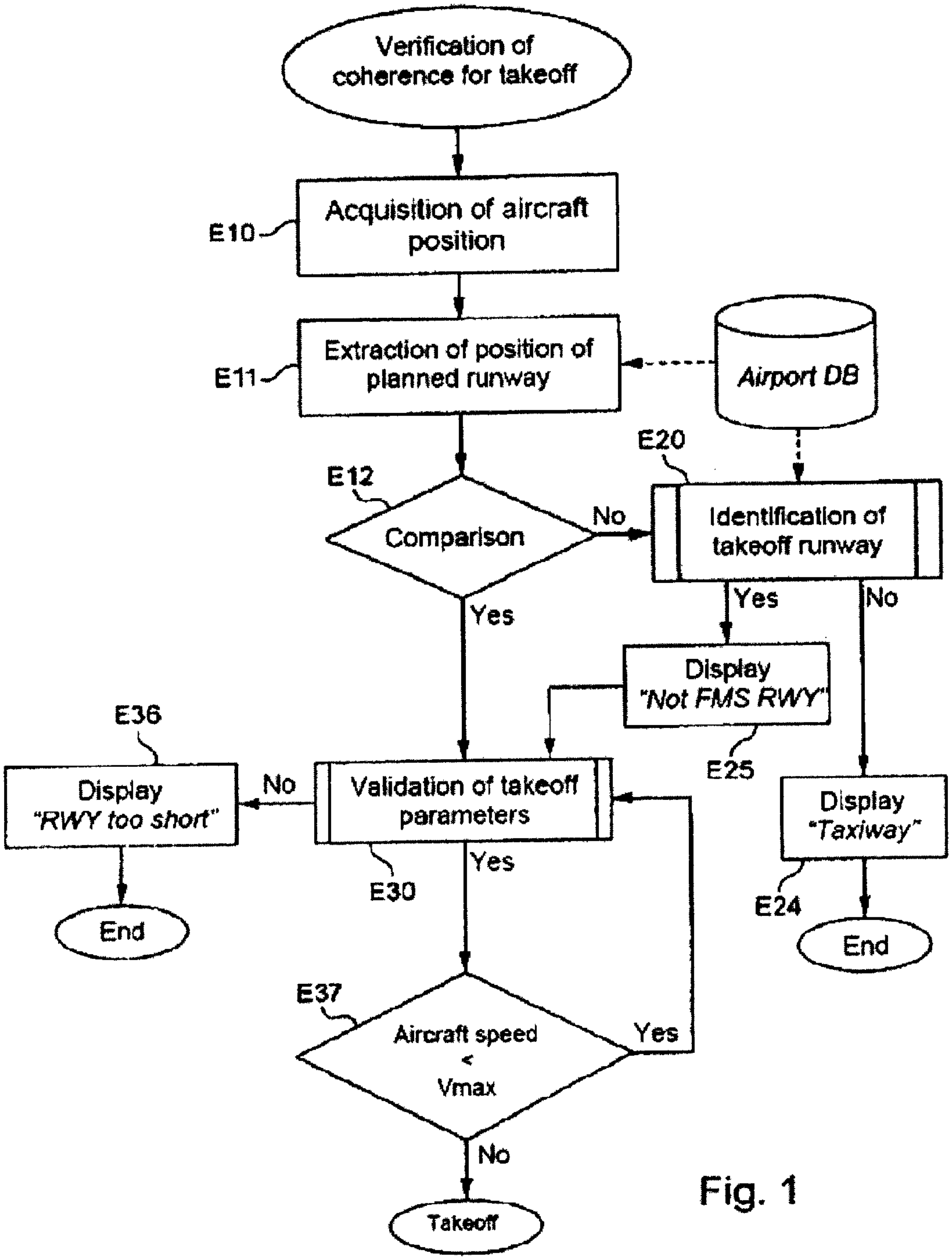
FIG. 1 is an algorithm illustrating the verification method according to one embodiment of the invention.

Referring to FIG. 1, there will first be described the method for verifying the coherence of the takeoff parameters of an aircraft according to one embodiment of the invention.

This verification method is employed at the moment of takeoff of the aircraft from an airport, in order to evaluate the ability of the aircraft to take off from a takeoff runway.

As a reminder, it is recalled that, during preparation for takeoff of an aircraft from a planned takeoff runway of the airport, takeoff parameters are inserted into the avionic systems. These parameters take into account in particular the weight of the airplane, the weight of fuel provided during flight preparation or the weight of fuel metered into the tanks, the thrust mode of the engines, the external ambient temperature provided by the control tower, the wind characteristics (speed and direction), also provided by the control tower, and the aerodynamic configuration of the hyper-lift devices of the aircraft (slats and flaps). The mode of operation of the air-conditioning system is also taken into account, since this air-conditioning system has an impact on the operation of the engines of the aircraft.

Similarly, the mode of operation of the deicing system is taken into account, since operation thereof has an impact on that of the engines.

These parameters also take into account the difference between the threshold of the planned takeoff runway and a point on the runway from which the pilots plan to begin takeoff.

The speed of initiation of rotation of the aircraft and the minimal climbing speed to be attained at an altitude of 35 feet (equal to 10.6 m) above the runway are also to be taken into account.

The slope of the planned takeoff runway and the total runway length available for the phase of ground roll to takeoff are also considered.

All of these parameters make it possible to optimize the performances of the airplane during takeoff and in particular to calculate a takeoff distance (or in other words the distance necessary for the aircraft to take off) as a function of the planned takeoff runway.

In practice, when a minimum set of parameters, and especially planned takeoff runway, weight at takeoff TOW (acronym for the English term "Take-Off Weight"), speed of initiation of rotation VR and minimum climbing speed V2 have been input into the flight management system FMS, it is possible to extract the takeoff distance D from performance tables of the FMS.

This distance D is interpolated on the basis of data indicated in the foregoing.

It will be noted that, when one or more of the parameters has or have not been input, default values are used, so that possible distance D, in order to avoid false alarms.

At the time of flight preparation, this distance D is compared with the remaining available runway length, or in other words the available runway length minus a planned position of the aircraft on the runway.

It will be noted that, in this case, the information items about the takeoff runway correspond to the takeoff runway inserted into the flight plan defined in the flight management system FMS.

If the comparison fails, an alert message is displayed on the pilot interface, for example in a message display zone of the MCDU or MFD interfaces.

The verification method to be described hereinafter makes it possible in particular to validate the takeoff parameters of an aircraft at the moment of takeoff.

In fact, during preparation for takeoff, or in other words during establishment of the takeoff performance and initialization of the systems (calculations of performances and acquisitions of parameters in the airplane systems), errors capable of jeopardizing takeoff safety may appear.

In particular, in case of errors of insertion of the runway into the flight plan, takeoff may take place from a runway other than that planned.

If the distance available on the runway being used is insufficient, the aircraft risks overrunning the runway or else colliding with an unexpected airplane or obstacle.

Furthermore, in case of error of insertion of a parameter, the airplane configuration does not conform with the hypotheses of the performance calculation, and overrunning of the runway may also be observed if the acceleration is insufficient relative to the available runway distance.

Similarly, at the time of the phase of taxiing and initiation of acceleration to takeoff, the parameters of the calculation may not be respected for several reasons, even if they were inserted correctly into the flight management system.

In the case in particular of airport navigation errors, takeoff of the aircraft may take place from a runway or access taxiway of the airport different from the runway planned at the time of flight preparation.

As in the foregoing, overrunning of the runway may be observed if the distance available on the selected runway is insufficient, or else a collision with an unexpected airplane or obstacle may take place.

Finally, a change in the atmospheric conditions compared with the conditions observed at the time of flight preparation may lead to an aircraft configuration that no longer conforms with the hypotheses of the performance calculation.

If the acceleration of the aircraft is insufficient compared with the available runway distance, it is also possible that the aircraft may overrun the runway.

The method of verifying the coherence of the takeoff parameters makes it possible to verify, at the last moment, before actual takeoff of the aircraft, the coherence of the parameters with the takeoff runway being used.

This method of verifying the coherence is employed as soon as the start of takeoff is detected, for example on the basis of the phases of flight detected by a flight monitoring system ("Flight Warning System" in English), of the position of the throttle lever or of the engine speed.

For this purpose, the verification method is provided firstly with a step E10 of acquiring the position of the aircraft the airport.

The position of an aircraft is determined in particular by the heading and its latitude and longitude coordinates.

Typically this position of the aircraft can be provided by a positioning system of the GPS type (acronym for the English term "Global Positioning System") or GPIRS (acronym for the English term "Global Positioning/Inertial Reference System").

A step E11 of extracting the position of the planned takeoff runway is employed on the basis of an airport database Airport DB in the flight management system.

This extraction step E11 also makes it possible to know the heading of the planned takeoff runway and the latitude and longitude coordinates of the threshold of the planned takeoff runway.

A comparison step E12 makes it possible to compare the position of the aircraft and the position of the runway threshold of the planned takeoff runway.

In practice, the latitude and longitude coordinates of the aircraft are compared with the latitude and longitude coordinates of the runway threshold.

In practice, it is verified that the position of the aircraft (latitude and longitude) is situated within a rectangle of approximately 100 m on each side of the centerline of the planned takeoff runway.

This tolerance of 100 m depends in particular of the precision of determination of the position of the aircraft.

Furthermore, the heading of the airplane and the heading of the planned takeoff runway are also compared for plus or minus a predetermined margin.

Figure 2:
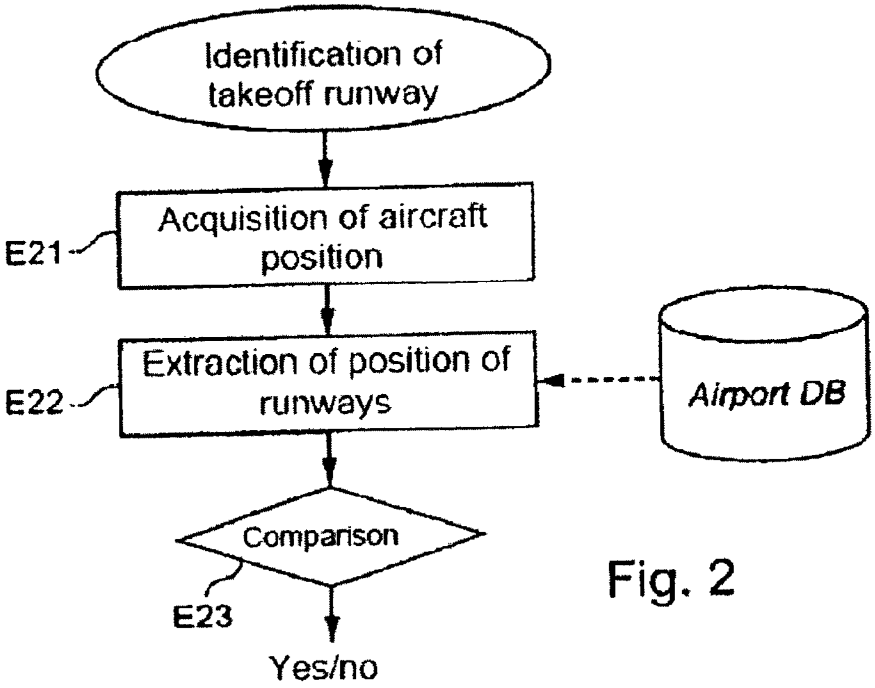
FIG. 2 is an algorithm detailing the step of identifying a takeoff runway of FIG. 1.

In case of disagreement between the position of the aircraft and the position of the planned takeoff runway, a step E20 of identifying a takeoff runway is employed as illustrated in FIG. 2.

This identification step E20 is also provided with a step E21 of acquiring the position of the aircraft, employed in the same way as acquisition step E10.

Furthermore, an extraction step E22 makes it possible to extract the position (heading and latitude coordinate of the runway threshold) from all of the accessible takeoff runways of the airport on which the aircraft is positioned.

This extraction step E22 is employed on the basis of the airport database Airport DB referencing all of the takeoff runways of the airport.

A comparison step E23 makes it possible to verify the agreement between the position of the aircraft and the position of the takeoff runways with a view to identifying a takeoff runway of the airport.

This comparison step E23 is employed with the same margins and tolerances as those described in the foregoing for comparison step E12.

In case of failure of this comparison step E23, a step E24 (see FIG. 1) of alerting the pilot is employed to signal that no takeoff runway of the airport has been identified as being in agreement with the position of the aircraft.

In practice, this alert step may be employed by virtue of the display of a taxiway message, indicating to the pilot that the aircraft is positioned on a traffic path of the airport and therefore is not ready to take off.

The verification method is then interrupted, as is takeoff of the aircraft.

On the other hand, in case of identification of a takeoff runway in comparison step E23, a step E25 of alerting the pilot is employed to signal the disagreement between the identified takeoff runway and a takeoff runway planned during preparation for takeoff.

This alert step E25 may be employed in practice by virtue of the display of a message of the type "other runway" or else "not FMS RWY" (abbreviated message for Not FMS Runway, meaning that it is not the takeoff runway stored in memory in the flight management system FMS).

Of course, it will be noted that the method for verifying coherence may directly employ the step E20 of identifying a takeoff runway on the basis of the airport database, without first employing steps E10 to E12 limited to the planned takeoff runway.

In this case, during the step E20 of identifying one takeoff runway among all the takeoff runways available the airport, an additional step makes it possible to verify, following identification of a takeoff runway on which the aircraft is positioned, if this identified takeoff runway corresponds to the planned takeoff runway.

Depending on the result of this comparison, the alert steps E24 and E25 are employed as described in the foregoing.

Figure 3:
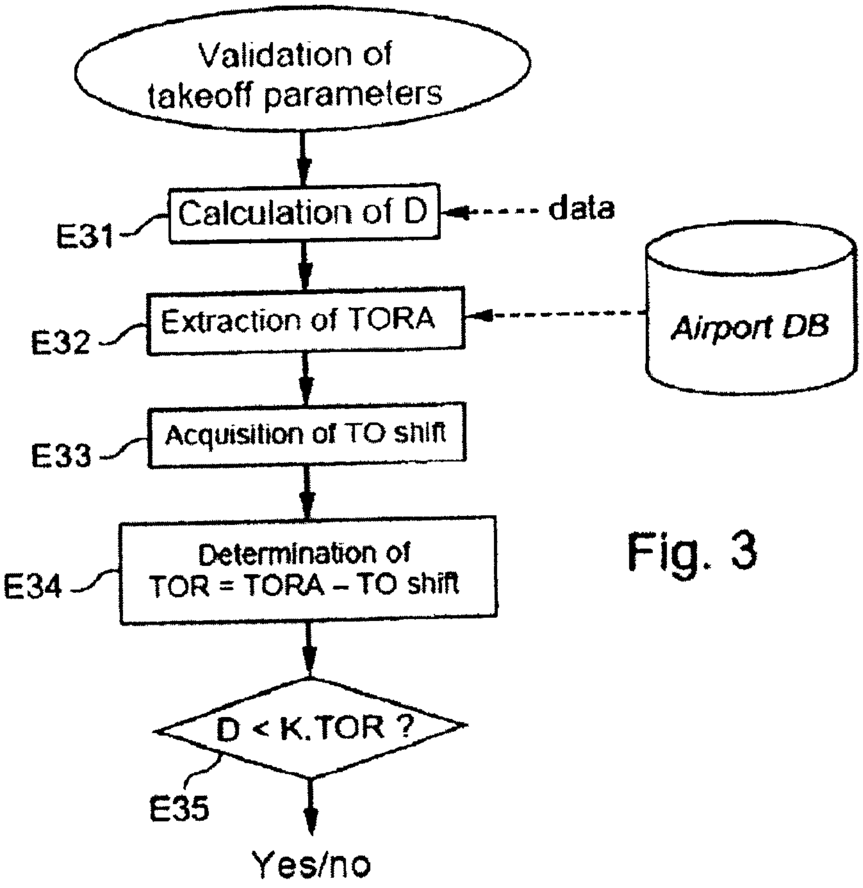
FIG. 3 is an algorithm detailing the step of validating the takeoff parameters of FIG. 1.

Once the takeoff runway corresponding to the position of the aircraft in the airport is identified, a step E30 of validating the takeoff parameters is employed, as illustrated in detail in FIG. 3.

The purpose of this validation step E30 is to verify automatically that the distance necessary for the aircraft to take off, as a function of known takeoff parameters, is consistent with an available runway length on the previously identified takeoff runway.

This validation step E30 first includes a step E31 of calculating a takeoff distance D on the basis of one or more takeoff parameters.

In reality, this calculation step E31 consists in updating the calculation of the distance D as a function of the evolution of certain parameters, compared with the distance calculation performed traditionally during flight preparation.

In particular, during this calculation step E31, certain data inserted into the flight management system during the flight preparation phase are retained (weight of the airplane without fuel, external ambient temperature, wind characteristics, speed of rotation VR and takeoff speed V2), whereas other parameters are considered in real time by virtue of transducers of the aircraft (weight of fuel on board, air-conditioning system, deicing system, thrust and aerodynamic configuration of the hyper-lift devices).

The distance D to be calculated must be the most representative possible of the takeoff distance that the aircraft must achieve.

Figure 4:
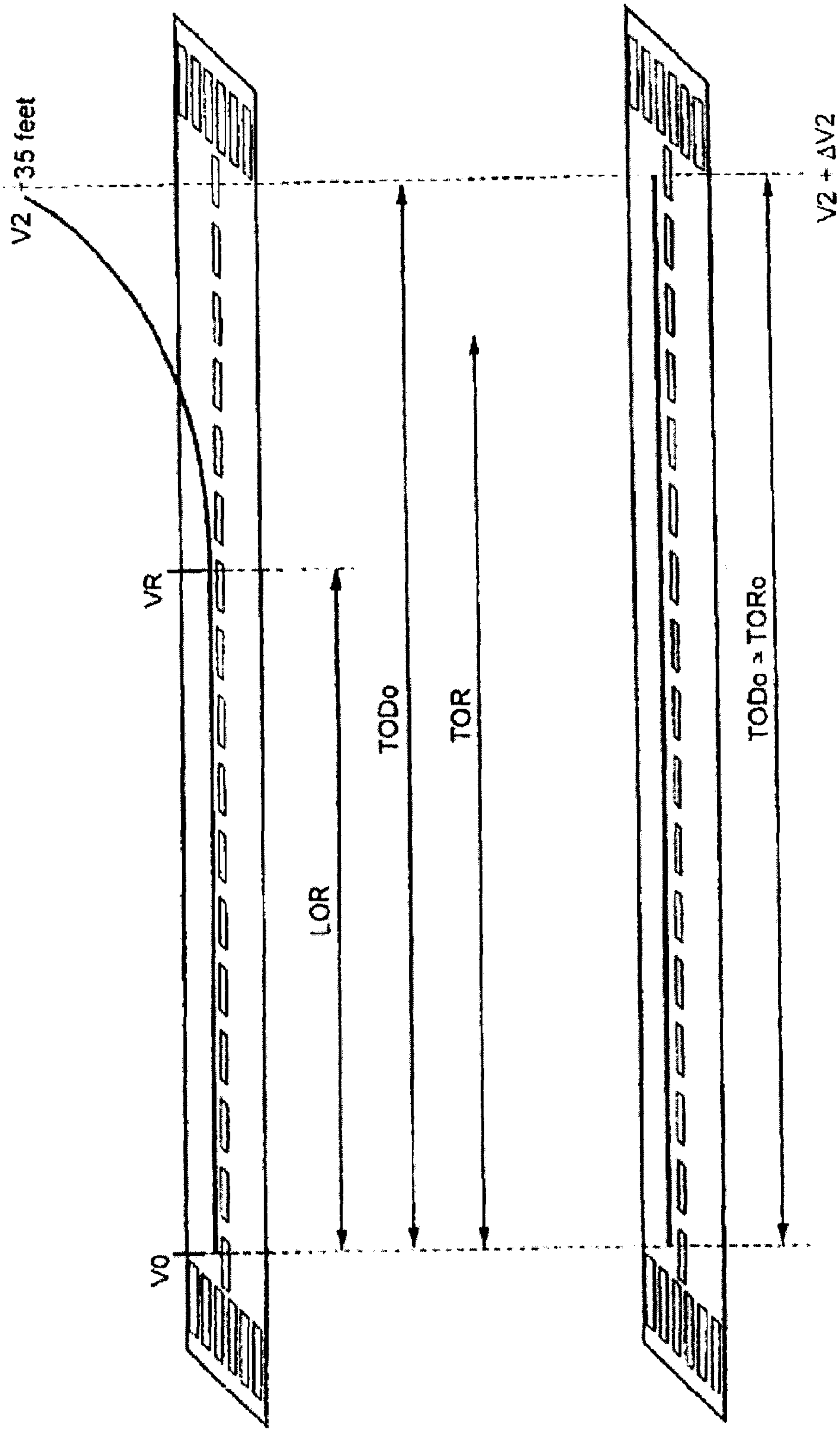
FIG. 4 is a diagram illustrating a step of calculation of a takeoff distance.

As illustrated in FIG. 4, this distance D may be in particular:

- a distance up to the position at which the aircraft separates from the ground (LOR or "Lift Off Run" in English);
- a distance up to an altitude of 35 feet (TOD or "Take Off Distance" in English); or
- an average distance of the two foregoing values (TOR or "Take Off Run" in English).

In order to cover the most frequent operations of the aircraft, the calculation employed in calculation step E31 does not consider engine breakdown, the distances being calculated with all engines in operation.

Preferably a simplified calculation is employed in the avionic system, such as the flight management system FMS, on the basis of simplified performance models.

Of course, a more precise calculation with the aid of an optimized calculation means, similar to that used during preparation for takeoff, also could be employed.

In the embodiment in which a simplified calculation is employed in the flight management system, calculation step E31 is employed by calculating a single phase of ground roll TORo, whose length is equal to the real takeoff length TODo corresponding to a phase of ground roll and a phase of initial climb to a predetermined altitude, and in this case to an altitude of approximately 35 feet (or approximately 10 m).

This ground roll takes place from an initial speed VO to a final speed VF, whose value is deduced on the one hand from the speeds of rotation VR and takeoff V2 entered by the pilot, and on the other hand from a speed increment ΔV2 or ΔVR, precalculated and dependent on several input parameters (weight of the aircraft, engine thrust, altitude, aerodynamics).

In this way the final speed is deduced from the following formula:

$$VF=V2+\Delta V2=VR+\Delta VR$$

The ground roll distance can then be calculated by integration of the final speed VF given by the mechanical ground roll equation:

$$m\frac{dV}{dt}=Fn-R_D-\beta\cdot \text{mg}-\mu(\text{mg}-R_L)$$

in which:

Fn=thrust ("thrust" in English)

$R_D$=drag ("drag" in English)

$R_L$=lift ("lift" in English)

m=weight at takeoff ("Take off weight" in English)

β=slope of the runway ("runway slope" in English)

μ=coefficient of friction ("friction coefficient" in English)

In this way the distance D is calculated from the following formula:

$$D=\left[\frac{GW\cdot\ln(Av^2+BV+C)}{2A}+GW*\frac{B}{A}*\frac{Argth\frac{2AV+B}{\sqrt{-4AC+B^2}}}{\sqrt{-4AC+B^2}}\right]_{VO}^{VF}+\left[2*GW*W*\frac{Argth\frac{2AV+B}{\sqrt{-4AC+B^2}}}{\sqrt{-4AC+B^2}}\right]_{VO}^{VF}$$

where

VO=initial speed of the aircraft (m/s)

VF: final speed in the air (m/s)

W: wind speed on the ground (m/s)

Argth: argument of the hyperbolic tangent

Ln: natural logarithm

GW: gross takeoff weight of the aircraft and in which A is a function that depends on the altitude, on the drag coefficient, on the lift coefficient and on the reference surface area, and the functions B and C depend on the thrust, on the total weight and on the runway slope.

Once the distance D has been calculated, an extraction step E32 is employed in order to extract the available runway length (TORA, the acronym for the English term "Take Off Run Available") corresponding to the total runway length available for ground roll until the moment of takeoff.

This available runway length TORA may be read from the airport database Airport DB.

A step E33 of acquiring the TO Shift distance (for the English term "Take Off Shift") makes it possible to know the difference between the runway threshold and the point on the runway from which the crew plans to begin takeoff.

During takeoff, the parameter TO Shift corresponds to the position of the aircraft on the takeoff runway at the moment of takeoff.

A determination step E34 makes it possible to determine the remaining runway length TOR from the available runway length TORA and the position of the aircraft.

In practice, the remaining available runway length TOR is obtained by the following formula:

$$TOR=TORA-TO\ Shift$$

A comparison step E35 is then employed to compare the calculated takeoff distance D and the remaining runway length TOR with a view to authorizing takeoff of the aircraft if the takeoff distance D is shorter than the remaining runway length TOR.

In practice, the following inequality is verified:

$$D<K\times\mathrm{TOR}$$

where K is a coefficient determined by a compromise between the safety constraints and the operational constraints.

It will be noted that the factor K may be different from that used for comparing the takeoff distance with the available runway length during the phase of flight preparation.

If comparison step E35 fails, or in other words if the takeoff runway is too short to permit takeoff of the aircraft under the existing conditions, an alert step E36 is employed to alert the pilot (see FIG. 1).

In practice, this alert step E36 may be achieved by displaying a message of the type "RWY too short", to indicate that the runway is too short ("Runway too short").

It will be noted that in alert steps E25, E24 and E36, types of alert means other than a display system may be used.

In particular, the emission of an acoustic alert may be used, or else luminous signals intended for the pilots may be turned on in the cockpit to alert the pilots about the modified takeoff conditions.

In this embodiment, and in a manner that is in no way limitative, if the takeoff distance at the end of step E35 is shorter than the available runway distance, step E30 of validation of the takeoff parameters is employed periodically up to a predetermined maximum speed of the aircraft.

In this way, as illustrated in FIG. 1, a test step E37 is employed after each validation step E30, in order to compare the speed of the aircraft to a maximal speed threshold $V_{max}$, for example equal to 100 knots (or 185 km/h).

As long as the speed of the aircraft remains lower than this maximal speed $V_{max}$, validation step E30 is employed periodically together with updates of the available parameters, and especially the speed and position TO Shift of the aircraft on the takeoff runway.

The parameters are updated in particular by virtue of the real-time measurements made by transducers of the aircraft.

When the speed of the aircraft exceeds this limit speed $V_{max}$, the method of verification of coherence is interrupted, in order to avoid tripping alarms at high speed and stopping of takeoff when the speed of the aircraft is already too high for the aircraft to be stopped without risk.

Of course, validation step E30 can take place only one single time, during application of thrust to the aircraft.

Figure 5:
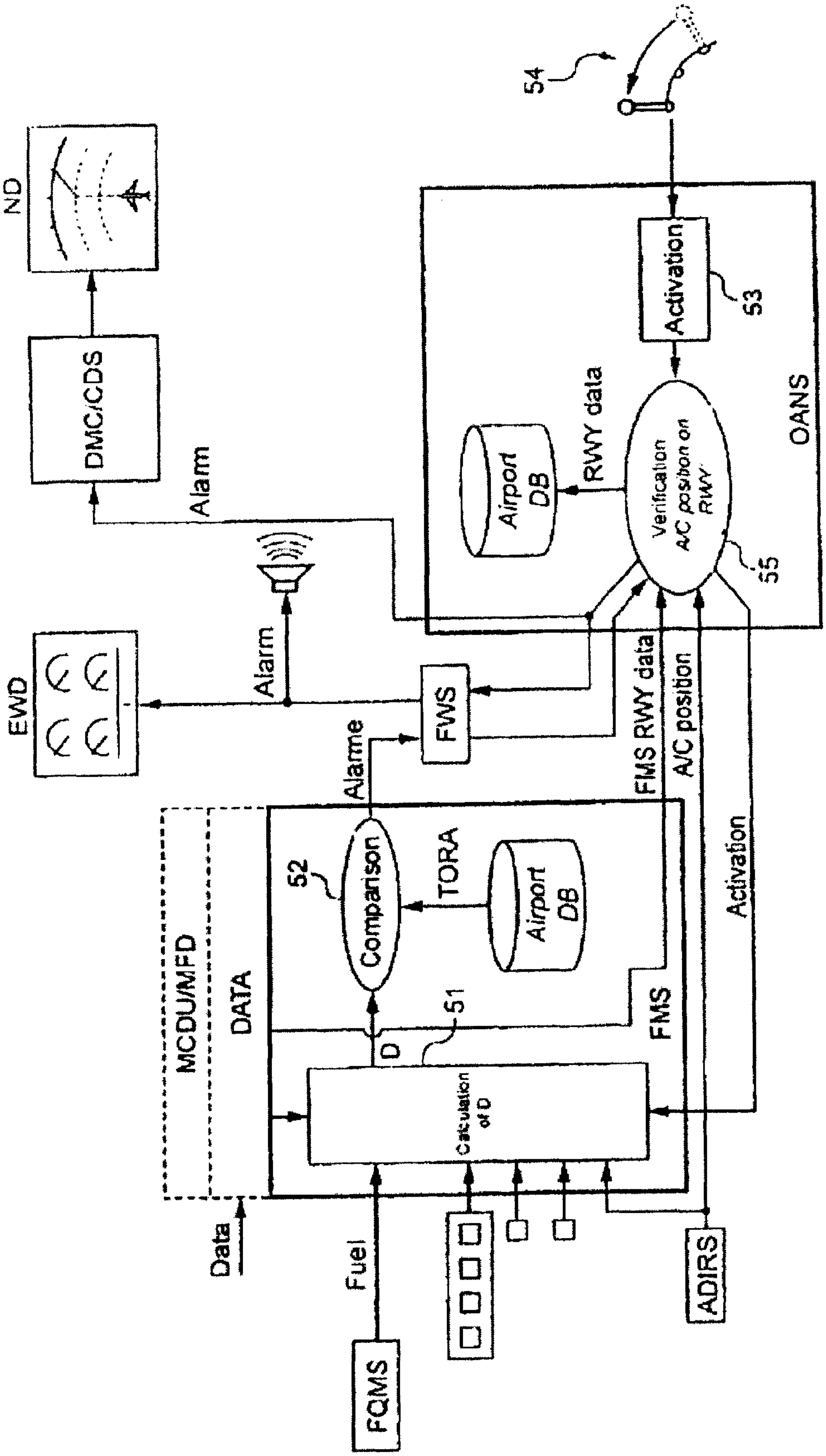
FIG. 5 is a block diagram illustrating means of a crew station of an aircraft according to a first embodiment of the invention.
Figure 6:
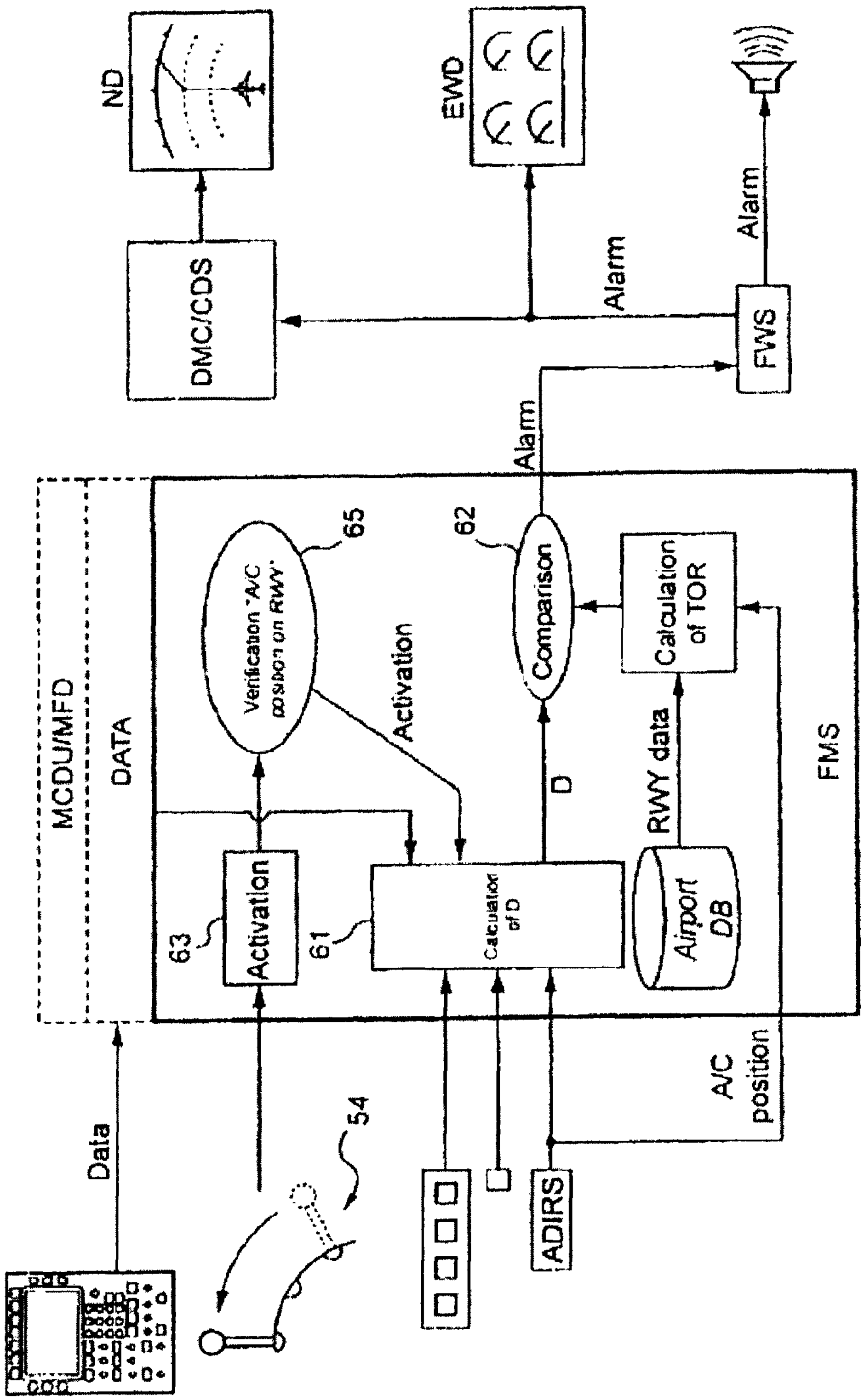
FIG. 6 is a block diagram illustrating means of a crew station of an aircraft according to a second embodiment of the invention.

FIGS. 5 and 6 illustrate means made available to the pilots in the piloting station ("cockpit" in English) for employing the verification method described in the foregoing.

Thus two different implementation architectures are envisioned in FIGS. 5 and 6.

As illustrated in FIG. 5, the aircraft is provided in this embodiment with an airport navigation system of the OANS type (acronym for the English term "On-board Airport Navigation System"), which makes it possible in particular to visualize the aircraft on an airport map displayed on a cockpit screen of the ND type (acronym for the English term "Navigation Display").

As illustrated in FIG. 5, flight management system FMS is interfaced with different cockpit modules for input or acquisition of data and parameters.

In particular, via interface means MCDU or MFD, the pilot may enter a large number of data, and in particular the planned takeoff runway, the length and slope of this runway, the configuration of the hyper-lift flaps, the takeoff weight of the aircraft, the weight of fuel, the initial speed of rotation, the takeoff speed, the temperature, the direction and speed of the wind, the thrust, etc., and in particular all of the parameters indicated in the foregoing, necessary to the calculation and to the employment of the verification method according to the invention.

Furthermore, on the basis of FQMS transducers (acronym for the English term "Fuel Quantity Management System"), the quantity of fuel on board may be sent to flight management system FMS.

A series of cockpit buttons and controls may also make it possible to acquire the configurations of the deicing and air-conditioning systems.

Other transducers also make it possible to obtain the position of the thrust lever or the position of the hyper-lift flaps.

Finally, a set of ADIRS transducers (acronym for the English term "Air Data Inertial Reference System") makes it possible to obtain the speed on the ground, the position of the aircraft in the airport or else the external temperature.

Calculating means 51 are integrated in the FMS system in order to calculate the distance D.

The available takeoff distance TORA may be sent from the airport database Airport DB to comparison means 52 capable of employing the comparison of the necessary takeoff distance D with the available runway distance as described in the foregoing.

Flight management system FMS is additionally connected to airport navigation system OANS.

This is provided with activation means 53 capable, on the basis of the position of control lever 54, of activating the verification procedure described in the foregoing.

Means 54 for verifying the position of the aircraft on a runway are employed on the basis of database Airport DB.

In order to verify the position of the aircraft relative to the available takeoff runways in the envisioned airport, verification means 54 are connected not only to airport database Airport DB but also, on the one hand, to the ADIRS transducers, making it possible to send the position of the aircraft, and, on the other hand, to the data entered in flight management system FMS, making it possible in particular to obtain knowledge of the takeoff runway planned during flight preparation.

These verification means 54 make it possible to send an activation command to the FMS system, and more particularly to calculating means 51, when the position of the aircraft corresponds to the position of a takeoff runway of the airport as indicated in the foregoing.

An alert control system FWS (acronym for the English term "Flight Warning System") is assembled in connection with the flight management system FMS and the airport navigation system OANS in order to manage the different types of alarm, especially as a function of the phases of flight of the aircraft.

In particular, these alarms may be acoustic alarms or else visual alarms displayed on the ND or EWD screens (acronym for the English term "Engine Warning Display").

Thus, if the comparison between the takeoff distance D and the available runway distance TOR is successful, the takeoff distance is displayed, for example in white, on the ND screen.

A different color, such as red, may be used to symbolize the takeoff distance in case of failure of the comparison and to invite the pilot to make the necessary modifications in case of errors.

FIG. 6 illustrates another type of implementation of the verification method of the invention when the cockpit is not provided with an airport navigation system OANS.

All of the modules and functions necessary for employment of the verification method are then integrated directly in the flight management system FMS.

In particular, means 61 for calculating the distance D, comparison means 62, means 63 for activating the verification method and means 65 for verifying the position of the aircraft on a takeoff runway are integrated in the flight management system FMS.

The entry data necessary for the different calculations are introduced into the system as described in the foregoing via different interfaces with the cockpit and with the transducers of the aircraft.

Of course, the present invention is not limited to the exemplary embodiments described in the foregoing.

In particular, the different data and parameters used to calculate the available distance may be modified and in particular enriched or simplified as a function of the complexity of the calculations.

The invention claimed is:

1. A method for verifying coherence of takeoff parameters of an aircraft from an airport with an available runway length at a moment of takeoff, the method comprising:

identifying a takeoff runway, including the following steps performed by a processor acquiring a position of the aircraft on a ground, extracting position data of a set of takeoff runways of the airport from an airport database, comparing the position of the aircraft and the position data of the set of takeoff runways of the airport with a view to identifying the takeoff runway, and alerting a pilot to signal disagreement between the identified takeoff runway and a planned takeoff runway provided during preparation for takeoff; and validating takeoff parameters, including calculating a takeoff distance from one or more of the takeoff parameters by calculating a single phase of ground roll having a length equal to a real takeoff length corresponding to a phase of ground roll and a phase of initial climb to a predetermined altitude, extracting an available runway length associated with the takeoff runway identified in the airport database, determining a remaining runway length from the available runway length extracted from the position of the aircraft, and comparing the calculated takeoff distance and the remaining runway length and authorizing takeoff of the aircraft if the calculated takeoff distance is shorter than the remaining runway length.

2. The method according to claim 1, wherein, in the identifying the takeoff runway, in case of failure of the comparing the position of the aircraft and the position data of the set of takeoff runways, alerting the pilot to signal that no takeoff runway of the airport has been identified as being in agreement with the position of the aircraft.

3. The method according to claim 1, comprising:

extracting position data of the planned takeoff runway during preparation for takeoff based on the airport database;

comparing the position of the aircraft and the position of the planned takeoff runway; and the identifying the takeoff runway is employed in case of disagreement between the position of the aircraft and the position of the planned takeoff runway.

4. The method according to claim 1, wherein the validating the takeoff parameters is employed periodically up to a predetermined maximum speed of the aircraft.

5. The method according to claim 1, wherein the calculating the takeoff distance is employed in the flight management system.

6. The method according to claim 5, wherein the predetermined altitude is between 0 and approximately 10 m.

7. An aircraft comprising a flight management system and an on-board airport navigation system for verifying coherence of takeoff parameters of the aircraft from an airport with an available runway length at a moment of takeoff, comprising:

an identifying section configured to identify a takeoff runway, the identifying section including an acquiring section configured to acquire a position of the aircraft on a ground, an extracting section configured to extract position data of a set of takeoff runways of the airport from an airport database, a comparing section configured to compare the position of the aircraft and the position data of the set of takeoff runways of the airport with a view to identifying the takeoff runway, and an alerting section configured to alert a pilot to signal disagreement between the identified takeoff runway and a planned takeoff runway provided during preparation for takeoff; and a validating section configured to validate takeoff parameters, the validating section including a calculating section configured to calculate a takeoff distance from one or more of the takeoff parameters by calculating a single phase of ground roll having a length equal to a real takeoff length corresponding to a phase of ground roll and a phase of initial climb to a predetermined altitude, an extracting section configured to extract an available runway length associated with the takeoff runway identified in the airport database, a determining section configured to determine a remaining runway length from the available runway length extracted from the position of the aircraft, and a comparing section configured to compare the calculated takeoff distance and the remaining runway length and to authorize takeoff of the aircraft if the calculated takeoff distance is shorter than the remaining runway length.

* * * * *